UNITED STATES PATENT OFFICE.

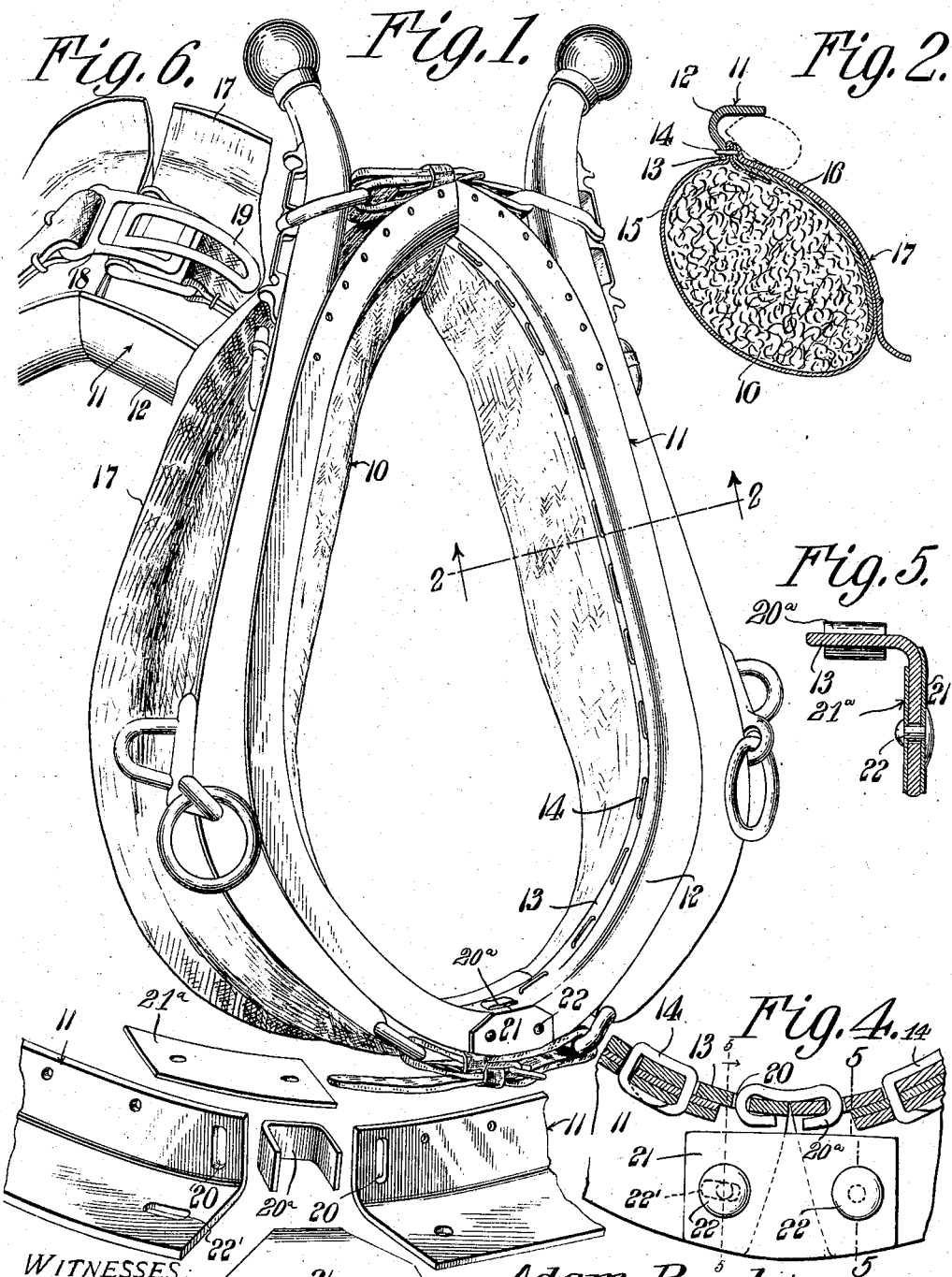

ADAM REED, OF MIDDLETOWN, DELAWARE, ASSIGNOR TO JOSEPH C. PARKER, OF MIDDLETOWN, DELAWARE.

HORSE-COLLAR.

No. 867,209.          Specification of Letters Patent.          Patented Sept. 24, 1907.

Application filed February 7, 1907. Serial No. 356,173.

*To all whom it may concern:*

Be it known that I, ADAM REED, a citizen of the United States, residing at Middletown, in the county of Newcastle and State of Delaware, have invented a new and useful Horse-Collar, of which the following is a specification.

This invention relates to collars for horses and similar animals, and one of the objects in view is to improve the original shape so as to more properly and comfortably fit the neck of the animal to which it is applied, and the collar being so constructed that once having received the proper shape it cannot either in shipment or in use be distorted or broken down or changed in form; and a further object which is closely related with that indicated is to provide such a construction of collar as to insure its initially receiving the proper shape without putting it on a former or block, so that the expense of blocking machines and the loss of time incident to subjecting the collar to that treatment are avoided.

A still further object of the invention is to provide a collar requiring no stiffening in the body roll, and wherein there is provision for holding the hames securely on the collar without the necessity of very tight adjustment thereof, it being a common practice with the ordinary collar, particularly in heavy hauling, to adjust the hames so tightly as to change the shape of the collar by compressing it laterally, and thus inconvenience or perhaps injure the animal; and moreover it is the object to so construct the collar that even if the hames are very tightly adjusted, the shape of the collar itself cannot in any way be affected.

Again, it is an object of this invention to provide a collar which cannot be twisted and which does not depend upon the hames to give it the necessary stiffness, but which is so constructed that when in place its rigidity is sufficient to withstand any legitimate strain applied thereto.

Other objects and advantages of the invention will appear in the following description, and it will be understood that various changes in the form, proportions and minor details of construction may be resorted to without departing from the spirit or sacrificing any of the advantages of the invention.

In the accompanying drawings:—Figure 1 is a perspective view of a collar constructed in accordance with the invention. Fig. 2 is a transverse section on the line 2—2 of Fig. 1. Fig. 3 is a detail view of the hinge joint. Fig. 4 is a section of the same. Fig. 5 is a vertical sectional view taken on the line 5—5 and looking in the direction of the arrow thereon. Fig. 6 is a fragmentary detail view in perspective exhibiting the manner in which the neck rolls are secured together at their upper ends.

Similar numerals of reference are employed to indicate corresponding parts throughout the several figures of the drawings.

The collar consists essentially of a body roll 10 and an outwardly concaved metallic rim 11 which occupies the place and performs the functions of the neck roll in the ordinary construction, said rim being sectional in construction, with the members thereof hinged together at their lower ends, and relatively movable at their upper ends, but provided both at their upper and lower ends with abutting extremities, so that when the collar is closed any lateral or other compressive force applied by the hames or otherwise will have no effect in changing the shape of the collar. The rim consists of a roll portion 12 and a flange 13 to which is fastened by the clips or rivets 14 the edges of a sack 15 which forms a covering of the body roll. This sack usually includes a canvas or other fabric portion extending over the inside of the roll from the flange around the rear of the roll where it is joined by a leather portion 16 which extends up to the flange so that the edge of the leather portion is engaged by the rivets or fastening devices, the edge of the fabric portion being interposed between the said leather portion and the flange of the rim. Any suitable leather or other facing 17 may be employed on the outside of the roll with its edge extending under the rim, and attached to the extremities of this facing are the members 18 and 19 of a clasp or locking device to hold the upper ends of the collar sections in their closed relative position, as shown in Fig. 6.

The preferred construction of hinge embodies slots 20 in the flange portions of the rim section adjacent to their lower extremities, and a clip 20ª of sheet metal or the equivalent thereof engaging said slots, and with its extremities engaged with or bearing against the exterior surface of the flange. Covering plates 21 and 21ª are secured by rivets or other fastening devices 22 to the outer and inner surfaces of the rim covering the joint, the slot 22′ in the rim through which one of these fastening devices extends being elongated sufficiently to permit the required limited pivotal movement.

In the manufacture of the collar herein described it has been found that by using rigid rim sections or members which abut at their extremities in use and which conform to the hames so that the latter will snugly fit the same, it is possible to properly form the body roll merely by attaching the edges of the sack to the flange of the rim, (said sack, of course, having been cut so as to be of the proper shape), and then stuffing the sack in the ordinary way, and finally hammering or pounding the sack on its inner side and toward the rim, so as to give it a somewhat flattened, or as it might be termed, cross sectionally elliptical form, instead of the perfectly round form which it receives in the stuffing operation. No blocking or pressure is necessary owing to the fact that there can be no distortion or variation in the shape since the rim positively defines the shape which the roll must receive. The flange portion of the rim being set outward slightly from the roll portion thereof protects the neck of the animal from contact with the fastening devices, and by giving the central portions of the sack a slight and gradually increasing enlargement at about the centers of the sides of the collar, it is possible, as shown in the dawing, to bulge the body roll inwardly at these points to produce the desired width in proportion to the length of the collar, but which would not be preserved if the shape of the roll were to be determined solely by the shape of the rim which is designed to fit the hames, the normal porportion of width to length being as nine to eighteen, in order that the contact of the collar with the neck of the animal may be uniform and comfortable.

The groove or seat formed between the roll portion of the rim and the body roll snugly receives the hames and insures their retention against any strain which may be applied thereto, and the abutment of the extremities of the rim sections not only insures rigidity of the collar, but absolutely prevents the contraction or distortion of the collar should the adjusting straps of the hames be drawn very tightly as is customary particularly in heavy hauling, in order to prevent the hames from slipping from the collar.

It will be observed that the rim forms a part of the collar and serves every function of the ordinary neck roll, and at the same time performs certain other functions which are not performed by the neck roll as ordinarily constructed.

I claim:—

1. A collar having a metallic rim and comprising relatively movable members hingedly connected at their lower extremities, and a protecting plate spanning the joint between the said members, secured at one end to one of the members and having a sliding engagement with the other member.

2. A collar having a metallic rim and comprising relatively movable members hingedly connected at their lower extremities, and a protecting plate spanning the joint between said members, secured at one end to one of the members and having a fastening device engaging a slot in the other member.

In testimony that I claim the foregoing as my own, I have hereto affixed my signature in the presence of two witnesses.

ADAM REED.

Witnesses:
N. KEMP,
JOSEPH C. PARKER.